United States Patent
Suzuki

(10) Patent No.: US 9,736,431 B2
(45) Date of Patent: Aug. 15, 2017

(54) CONTENT SUBSCRIPTION PACKAGE MANAGEMENT

(71) Applicant: Verizon Patent and Licensing Inc., Basking Ridge, NJ (US)

(72) Inventor: Clifford A. Suzuki, San Jose, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 369 days.

(21) Appl. No.: 13/929,716

(22) Filed: Jun. 27, 2013

(65) Prior Publication Data

US 2014/0280793 A1    Sep. 18, 2014

Related U.S. Application Data

(60) Provisional application No. 61/786,190, filed on Mar. 14, 2013.

(51) Int. Cl.
*H04N 7/16* (2011.01)
*H04M 1/725* (2006.01)
*G06Q 30/02* (2012.01)

(52) U.S. Cl.
CPC ............ *H04N 7/162* (2013.01); *G06Q 30/02* (2013.01); *H04M 1/72563* (2013.01)

(58) Field of Classification Search
CPC . H04L 41/0803; H04L 7/162; H04M 1/72563
See application file for complete search history.

(56) References Cited

U.S. PATENT DOCUMENTS

| | | | | |
|---|---|---|---|---|
| 6,256,498 | B1* | 7/2001 | Ludwig | H04W 64/00 455/433 |
| 6,539,548 | B1* | 3/2003 | Hendricks | H04H 20/42 348/E5.002 |
| 6,704,787 | B1* | 3/2004 | Umbreit | G06F 21/31 340/512 |
| 6,788,926 | B1* | 9/2004 | Frangione | H04W 24/08 455/405 |
| 8,365,213 | B1* | 1/2013 | Orlowski | G06Q 30/0251 725/13 |
| 8,819,711 | B2* | 8/2014 | Walker et al. | 725/1 |
| 2002/0151327 | A1* | 10/2002 | Levitt | G06F 17/30867 455/556.1 |
| 2003/0032409 | A1* | 2/2003 | Hutcheson | G06Q 30/02 455/414.1 |
| 2003/0117445 | A1* | 6/2003 | Hendricks | H04H 20/91 715/810 |

(Continued)

*Primary Examiner* — Jimmy H Tran

(57) ABSTRACT

In embodiments, apparatuses, methods and storage media are described that are associated with configuration of content subscription packages. In various embodiments, a subscription package management/selection entity ("SPM") may provide a facility for configuring and/or managing one or more content subscription packages. The SPM may be configured to facilitate generation of subscription packages using one or more tiers. The SPM may be configured to communicate with a content consumption device to provide subscription package information for consumption by a content consumer. The SPM may also be configured to facilitate a consumer in selecting and/or purchasing one or more content subscription packages. Other embodiments may be described and/or claimed.

25 Claims, 7 Drawing Sheets

(56) References Cited

U.S. PATENT DOCUMENTS

| | | | |
|---|---|---|---|
| 2003/0203731 A1* | 10/2003 | King | G06Q 30/04 455/407 |
| 2006/0014535 A1* | 1/2006 | Walker | H04M 1/72563 455/433 |
| 2007/0115929 A1* | 5/2007 | Collins et al. | 370/352 |
| 2007/0174125 A1* | 7/2007 | Poole | G06Q 30/02 705/14.66 |
| 2009/0100459 A1* | 4/2009 | Riedl | H04N 21/2385 725/35 |
| 2009/0210899 A1* | 8/2009 | Lawrence-Apfelbaum | H04L 12/2801 725/34 |
| 2010/0131969 A1* | 5/2010 | Tidwell | H04H 60/31 725/14 |
| 2011/0131621 A1* | 6/2011 | Brehm | G06Q 30/0613 725/109 |
| 2011/0321072 A1* | 12/2011 | Patterson | H04N 21/44222 725/5 |
| 2012/0089996 A1* | 4/2012 | Ramer | H04H 60/46 725/14 |
| 2013/0085864 A1* | 4/2013 | Ahmed | H04W 4/18 705/14.66 |
| 2014/0095690 A1* | 4/2014 | Saker | H04L 65/1033 709/224 |

\* cited by examiner

CONTENT SUBSCRIPTION PACKAGE MANAGEMENT

RELATED APPLICATION

This application claims the benefit of U.S. Provisional Application No. 61/786,190, filed Mar. 14, 2013 and titled "CONTENT SUBSCRIPTION PACKAGE MANAGEMENT." The specification of U.S. Provisional Application No. 61/786,190 is hereby incorporated by reference.

TECHNICAL FIELD

The present disclosure relates to the field of data processing, in particular, to apparatuses, methods and storage media associated with facilitating management and selection of content subscriptions.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of content, and the manners in which the content is consumed. Today, myriad content may be made available from various sources of content, including but not limited to fixed medium (e.g., Digital Versatile Disk (DVD)), broadcast, cable operators, satellite channels, Internet, and so forth. In some circumstances, content may be made available to consumers through the purchase of subscription packages.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
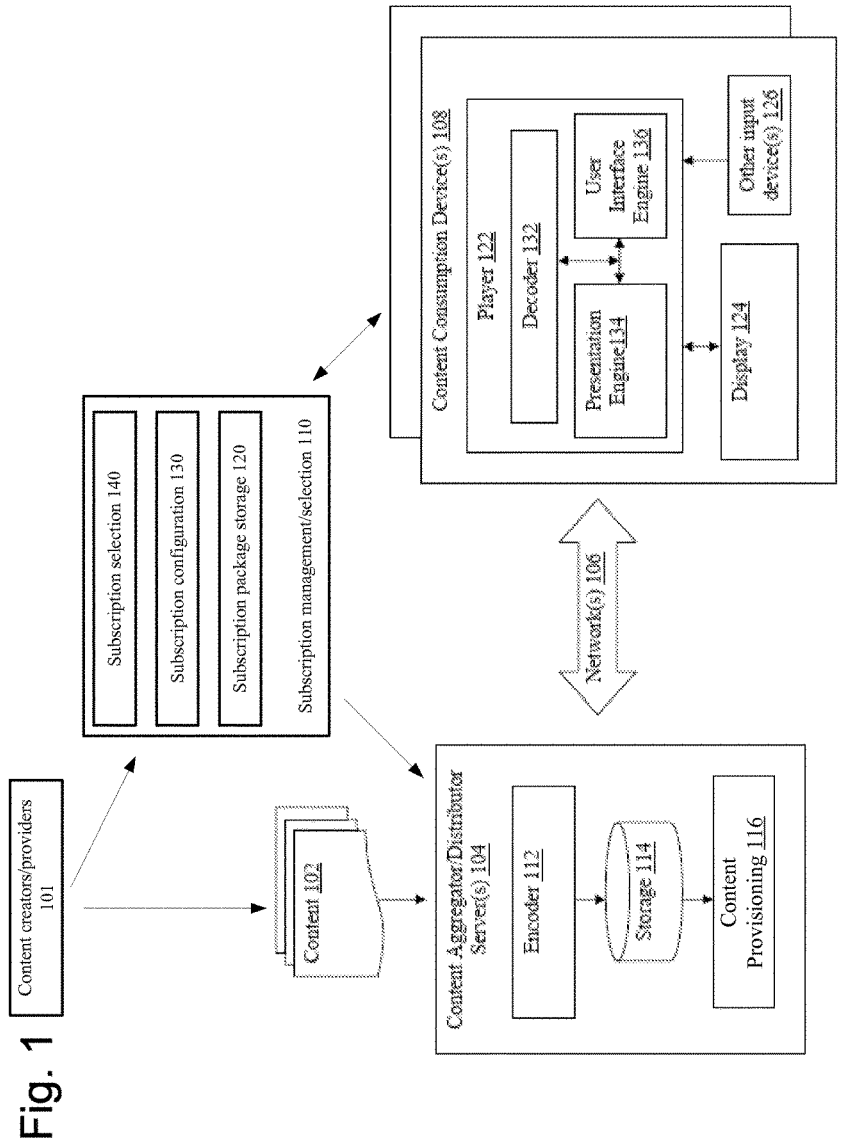
FIG. 1 illustrates an arrangement for content distribution and consumption, in accordance with various embodiments.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106.

In embodiments, as shown, content aggregator/distributor servers 104 may include encoder 112, storage 114 and content provisioning 116, which may be coupled to each other as shown. Encoder 112 may be configured to encode content 102 from various content creators and/or providers 101, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers 101. Examples of content may include, but are not limited to, movies, TV programming, user created content (such as YouTube video, iReporter video), music albums/titles/pieces, and so forth. Examples of content creators and/or providers 101 may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

Figure 2:
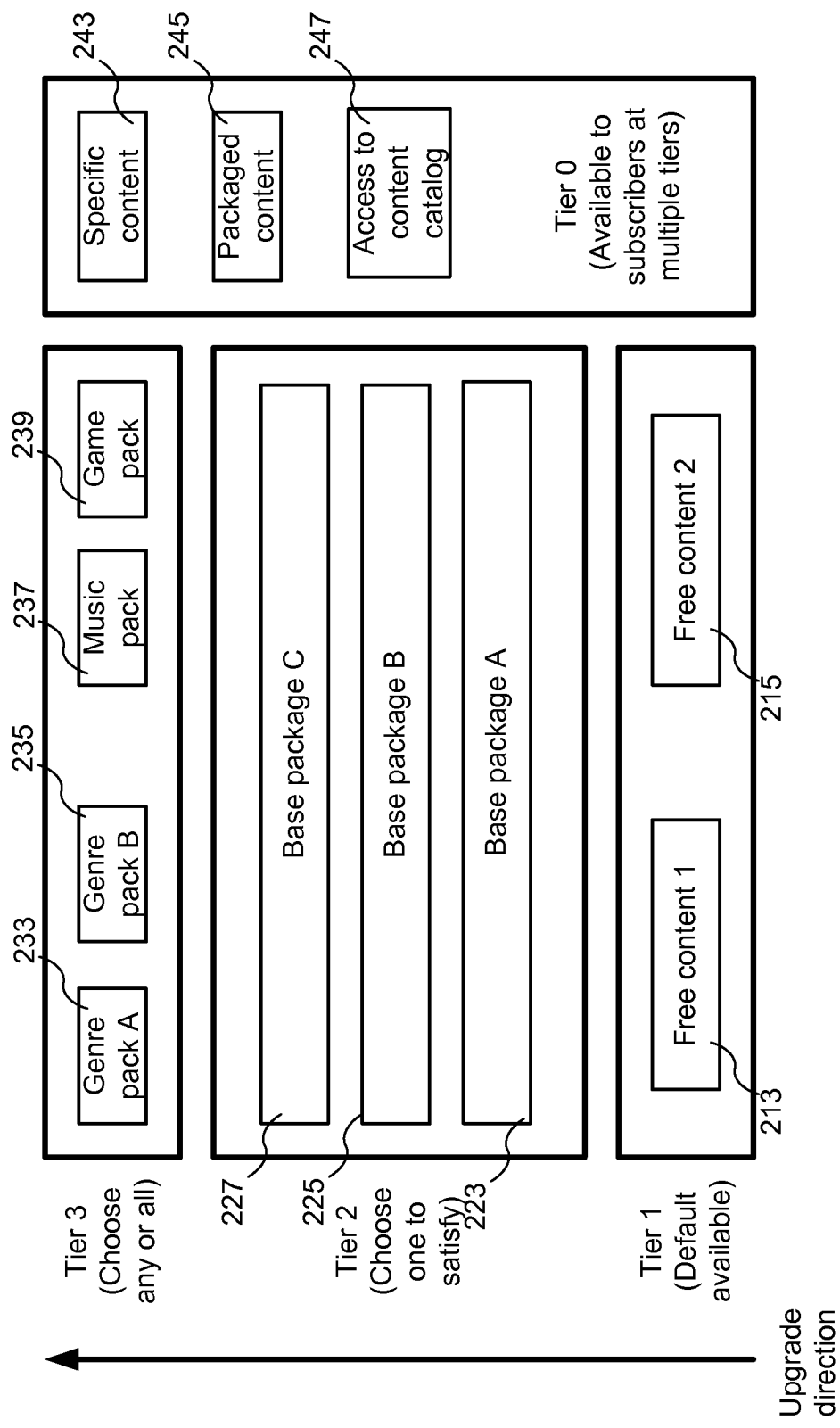
FIG. 2 illustrates an example arrangement of subscription package tiers, in accordance with various embodiments.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. In various embodiments, content provisioning 116 may be configured to provide media files that are packaged according to one or more output packaging formats. In various embodiments, content provisioning 116 may include a transpackager, such as illustrated in FIG. 2 below, which may be configured to package content files encoded by the encoder 112 in one or more output packaging formats for subsequent provisioning. Particular embodiments of transpackagers and transpackaging may be described below.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, as shown, a content consumption device 108 may include player 122, display 124 and user input device 126. Player 122 may be configured to receive streamed content, decode and recover the content from the content stream, and present the recovered content on display 124, in response to user selections/inputs from user input device 126.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from user input device 126 that are indicative of the user selections/inputs from a user, and to selectively render a contextual information interface as described herein.

While shown as part of a content consumption device 108, display 124 and/or user input device(s) 126 may be stand-alone devices or integrated, for different embodiments of content consumption devices 108. For example, for a television arrangement, display 124 may be a stand alone television set, Liquid Crystal Display (LCD), Plasma and the like, while player 122 may be part of a separate set-top set, and user input device 126 may be a separate remote control, gaming controller, keyboard, or another similar device. Similarly, for a desktop computer arrangement, player 122, display 124 and user input device(s) 126 may all be separate stand alone units. On the other hand, for a tablet arrangement, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and user input device(s) 126 may be likewise integrated.

In various embodiments, a subscription package management/selection entity 110 ("SPM 110") may communicate with various other entities described herein, including the content creators/providers 101, the content aggregator/distributor server(s) 104 and/or the content consumption device(s) 108. In various embodiments, the SPM 110 may include one or more software and/or hardware modules, such as for example, a subscription configuration module 130 and/or subscription selection module 140, which may be configured to provide a facility for configuring and/or managing one or more content subscription packages. In various embodiments, a subscription package may include an agreement whereby a content consumer may be given access to one or more pieces of content. In various embodiments, this access may be given in exchange for payment, such as a recurring payment or a one-time payment. In other embodiments, the access may be given in exchange for an action, such as an agreement to allow advertising to be displayed, or overt consumption of advertising. In other embodiments, the access may be given without requiring additional payment and/or actions on the part of the content consumer. In various embodiments, subscription packages may be time limited or indefinite. In various embodiments, subscription packages may be defined around content, such as content type (including, but not limited to media type, genre, live action content, movies, television, audio, etc.), content creator/provider 101, content consumer identification, content time and/or date, and/or other characteristics.

In various embodiments, the SPM 110 may be configured to provide an interface for content creators/providers 101 to configure and/or manage the one or more content subscription packages, such as, but not limited to, a web interface or an interface through a dedicated application. In various embodiments, this interface may be provided, in whole or in part, from the subscription configuration module 130. In various embodiments, the subscription configuration module 130 of the SPM 110 may be configured to communicate with the content aggregator/distributor server(s) 104 to provide subscription package information, thereby facilitating the content aggregator/distributor server(s) 104 in identifying content that can and/or cannot be provided to a content consumer. In various embodiments, the SPM 110 may be configured to communicate with the content consumption device(s) 108.

In various embodiments, the subscription selection module 140 of the SPM 110 may be configured to communicate with the content consumption device(s) 108 to provide subscription package information to facilitate the content consumption device(s) 108 in requesting, receiving, and presenting content for consumption by a content consumer. In various embodiments, the subscription selection module 140 of the SPM 110 may also be configured to communicate with the content consumption device(s) 108 in order facilitate a consumer in selecting and/or purchasing one or more content subscription packages. In other embodiments, the SPM 110 may be configured to provide an separate interface for selecting and/or purchasing one or more subscription packages. The interface may include, but is not limited to, a web interface or an interface through a dedicated application.

Referring now to FIG. 2, an example arrangement of subscription package tiers is illustrated in accordance with various embodiments. While subscriptions are described as being content subscriptions, in various embodiments, subscriptions may be created, configured selected, purchased, etc. for other products, items, merchandise, etc. For example, in various embodiments subscriptions may be generated for merchandise, such as physical products for rental or lease. In another example, in various embodiments subscriptions may be generated for metered rights to content or products, such as a right to a number of downloads and/or purchases of a product. In another example, in various embodiments subscriptions may be generated for metered usage of a product, such as a number of hours of game play, of content consumption, etc. In another example, in various embodiments subscriptions may be generated for service credits and/or currency, such as points or other currency that may be purchased and redeemed; these points may, in various embodiments, be persistent, or may expire after time.

In various embodiments, the SPM 110 may be configured to facilitate generation of subscription packages using one or more tiers; FIG. 2 provides an example usage of these tiers. In various embodiments, tiers may serve as organizational tools to include different subscription package options which may be selected by content consumers. It maybe noted that while particular tiers and subscription package options are illustrated in FIG. 2, this is offered as an example only; in various embodiments, other arrangements of tiers and/or subscription package options may be utilized. Additionally, in various embodiments, the tiers may facilitate content creators/providers 101 in organizing subscription package options within and between tiers.

For example, in various embodiments, the SPM 110 may be configured to facilitate a hierarchical arrangement of tiers. An example of such a hierarchical arrangement may be found in Tiers 1-3 of FIG. 2. In such hierarchical arrangements, the SPM 110 may be configured to provide subscription package options for a particular tier only when requirements for a lower tier are satisfied.

In various embodiments, a tier may be satisfied for a content consumer in multiple ways. For example, in some embodiments, a tier may be satisfied by default, without requiring selection of any particular subscription option by a content consumer. In the example of FIG. 2, Tier 1 is illustrated as providing multiple free content subscription options 213 and 215. In various embodiments, content creators/providers 101 may identify such content to be available by default to any content consumer.

In other embodiments, a tier may provide a facility for a content creator/provider to offer one or more subscription package options from which one may be chosen by a content consumer. In various embodiments, these the content creator/provider 101 may choose to allow a tier to be satisfied when one of the one or more subscription options is selected by a content consumer. It may be noted that, while the example subscription package options of Tier 2 may be chosen in the alternative from each other, they may contain content and/or subscriptions in common. For example, in FIG. 2, the content consumer may select one of base package subscription A 223, a base package subscription B 225, or base package subscription C 227. In various embodiments, one or more of the Base package subscriptions A, B, and C (223, 225, and 227) may include a set of content which may be chosen by a content consumer as a minimal subscription set. This minimal content set, in various embodiments, may be a part of all subscription package options for the tier. In various embodiments, one or more of the Base package subscriptions A, B, and C (223, 225, and 227) may include additional content on top of that minimal subscription set.

In other embodiments, a tier may provide a facility for a content creator/provider to offer one or more subscription package options that may be chosen along-side one another. For example in Tier 3 of the example of FIG. 2, a content consumer may choose one or more of the different subscription package options illustrated. As shown in the illustration, subscription package options may include package options based on content genre (such as genre pack A 233 and genre pack B 235), music (music pack 237), or games (game pack 239); in other embodiments, other options may be provided.

As FIG. 2 also illustrates, in various embodiments, the SPM 110 may provide for tiers which are not hierarchically arranged. Thus, in the example of FIG. 2, Tier 0 provides for a content creator/provider 101 to chose to allow a content consumer to select subscription package options which are not tied to tier hierarchy requirements. Thus, because the tier is not hierarchically arranged, these content options may be selected by a content consumer regardless of which tiers, if any, have been satisfied in a separate hierarchy. A content consumer may select, for example, an specific content subscription (selection 243), a packaged content subscription (selection 245), and/or access to a content catalog (selection 247) regardless of which of Tiers 1-3 have been satisfied.

In various embodiments, content creators/providers 101 may be facilitated in generating tiers and/or subscription package options by the SPM 110 through application of one or more business rules. Thus, in various embodiments, business rules may be applied by the SPM 110 to information about content creators/providers 101, content consumers, and/or content itself to determine tiers and/or subscription package options. These tiers and/or subscription package options may be reviewed and modified by content creators/providers 101 to generate tiers and/or subscription package options for selection by content consumers. Additionally, as discussed above, in various embodiments the subscription configuration module 130 of the SPM 110 may be configured to provide a graphical interface for generation, review, and selection of tiers and/or subscription package options. In various embodiments, content creators/providers 101 may be facilitated by the subscription configuration module 130 of the SPM 110 in configuring tiers and/or subscription package options through this interface, such as by selection of tiers and/or subscription package options or through dragging and dropping of subscription package options into, out of, and/or between tiers. Particular examples of interactions between content creators/providers 101, content consumers, and the SPM 110 follow.

Figure 3:
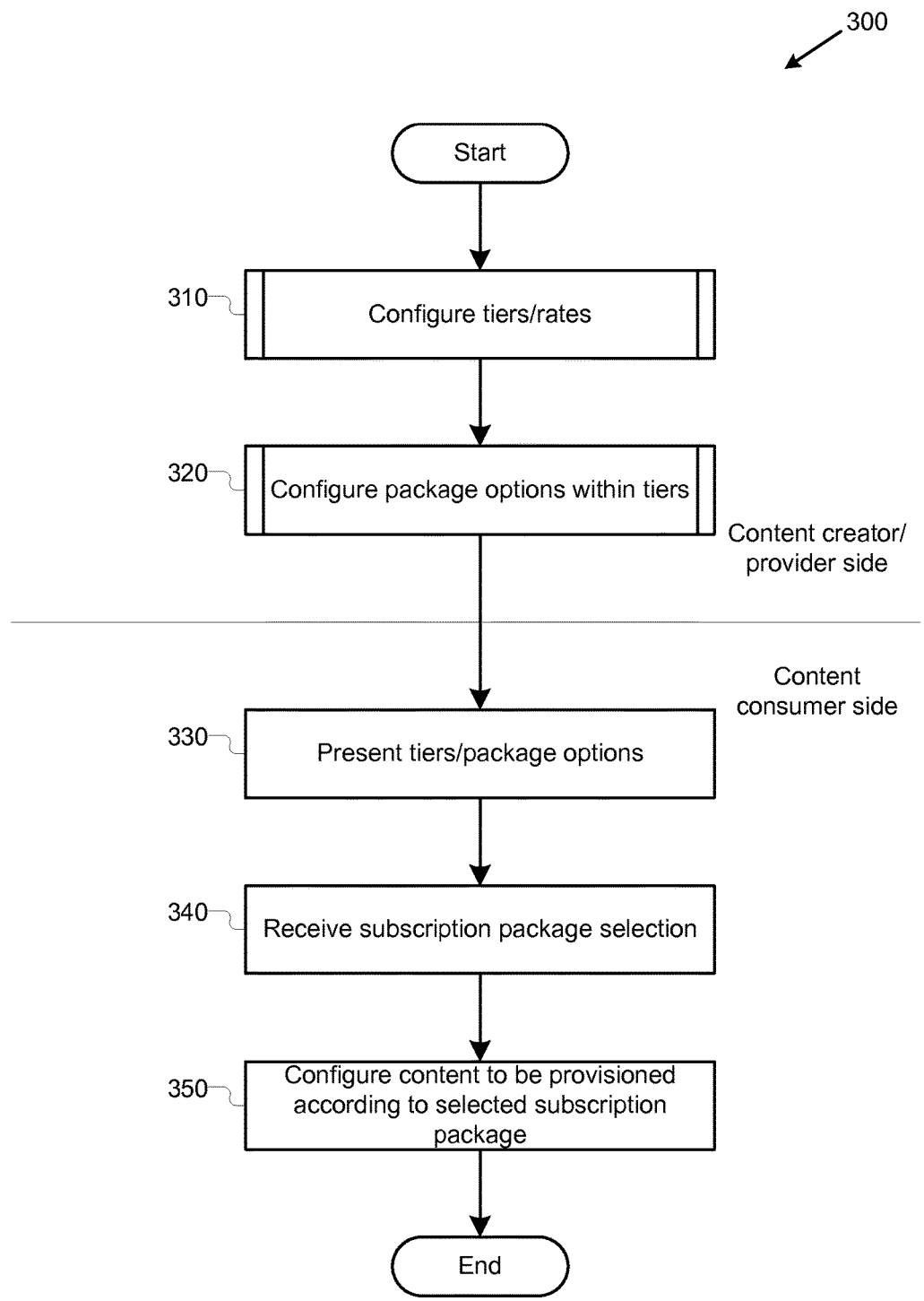
FIG. 3 illustrates an example process for configuring and selecting subscription packages, in accordance with various embodiments.

Referring now to FIG. 3, an example process 300 for configuring and selecting subscription packages is illustrated in accordance with various embodiments. In various embodiments, the operations described in process 300 may be combined, split into additional operations, and/or omitted. In various embodiments, process 300 may be performed by the subscription configuration module 130 of the SPM 110. The process may begin at operation 310, where the SPM 110 may facilitate a content creator/provider 101 in configuring one or more tiers and/or rates. Particular implementation examples for operation 310 are described below with reference to process 400 of FIG. 4. Next, at operation 320, the SPM 110 may facilitate the content creator/provider 101 in configuring subscription package options within the configured tiers. Particular implementation examples for operation 320 are described below with reference to process 500 of FIG. 5.

Continuing to operation 330, the SPM 110 may present one or more tiers and/or subscription package options to a content consumer. In various embodiments, the presentation of the tiers and/or subscription package options may be provided through a graphical interface, such as through a content consumption device 108, or thought a web-based interface. Next, at operation 340, the SPM 110 may receive one or more subscription package selections, such as through the presented interface. Next, at operation 350, the SPM 110 may then facilitate configuration of one or more entities, such as the content aggregator/distributor server(s) 104 and/or the content consumption device(s) 108 to provide content according to the selected subscription package. The process may then end.

Figure 4:
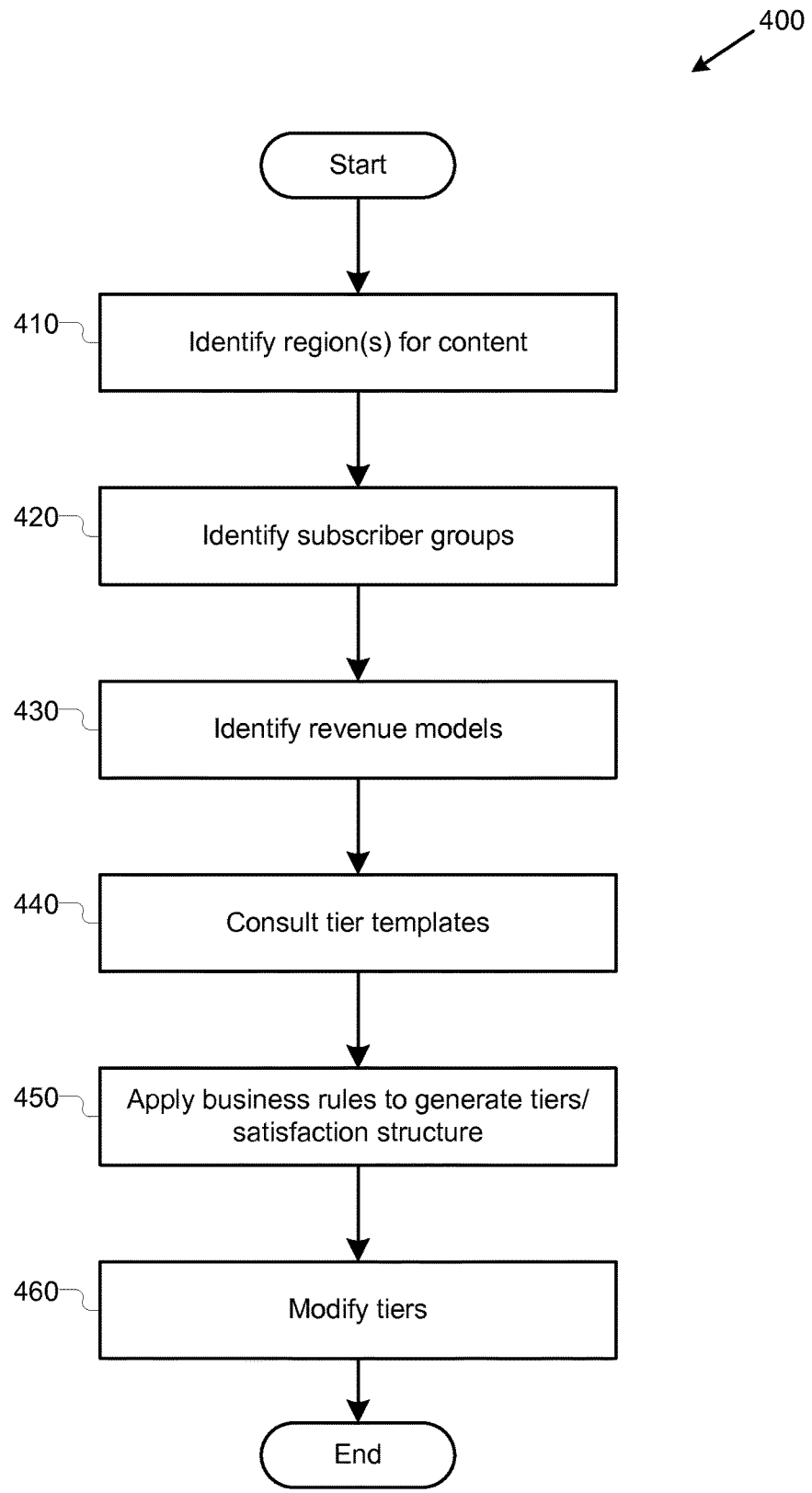
FIG. 4 illustrates an example process for configuring subscription package tiers, in accordance with various embodiments.

Referring now to FIG. 4, an example process 400 for configuring subscription package tiers is illustrated in accordance with various embodiments. In various embodiments, the operations described in process 400 may be combined, split into additional operations, and/or omitted. In various embodiments, the subscription configuration module 130 of the SPM 110 may perform one or more of the operations of process 400, such as through interactions with the content creators/providers 101. The process may begin at operation 410, wherein the SMV 100 may identify regions for content to be provisioned. In various embodiments, regions may be identified based on information provided by the content creators/providers 101, locations of content consumption device(s) 108, locations of content consumers, and/or based on other information. In various embodiments, regions identified at operation 410 may vary in size and/or shape, from national level down to, for example, a level of individual neighborhoods. Next, at operation 420, the SPM 110 may identify subscriber groups. Similarly to above, in various embodiments, these subscriber groups may be identified based on information provided by the content creators/providers 101, identities and/or demographic information for content consumers, owners of content consumption device(s) 108, etc. In various embodiments, some or all of the information used to identify subscriber groups and/or regions may be obtained from content consumption device(s) 108, such as by content consumers entering the information into the content consumption device(s) 108.

Next, at operation 430, the SPM 110 may identify revenue models for content provision. In various embodiments, revenue models may be identified based on various information, such as subscription history for regions and or subscriber groups, content consumer income, ownership, and/or buying patterns, consumer surveys, etc. Next, at operation 440, the SPM 110 may consult one or more tier templates. In various embodiments, the SPM 110 may include templates of tiers, which may include tiers that are hierarchically-structured as well as other tiers. At operations 450, the SPM 110 may apply one or more business rules to these templates, along with information that was previously identified at operations 410-430, to generate an actual tier structure through which subscription package options may be organized and/or presented. Additionally, at operation 450, the SPM 110 may determine a satisfaction structure for the hierarchical tiers. In some embodiments, these satisfaction structures may be contained in the tier templates; in others, application of business rules may identify likely satisfaction structures. Next, at operation 460, the content creators/providers 101 may be presented with tier structures that were generated through application of the business rules and provided an opportunity to modify these structures. The process may then end.

Figure 5:
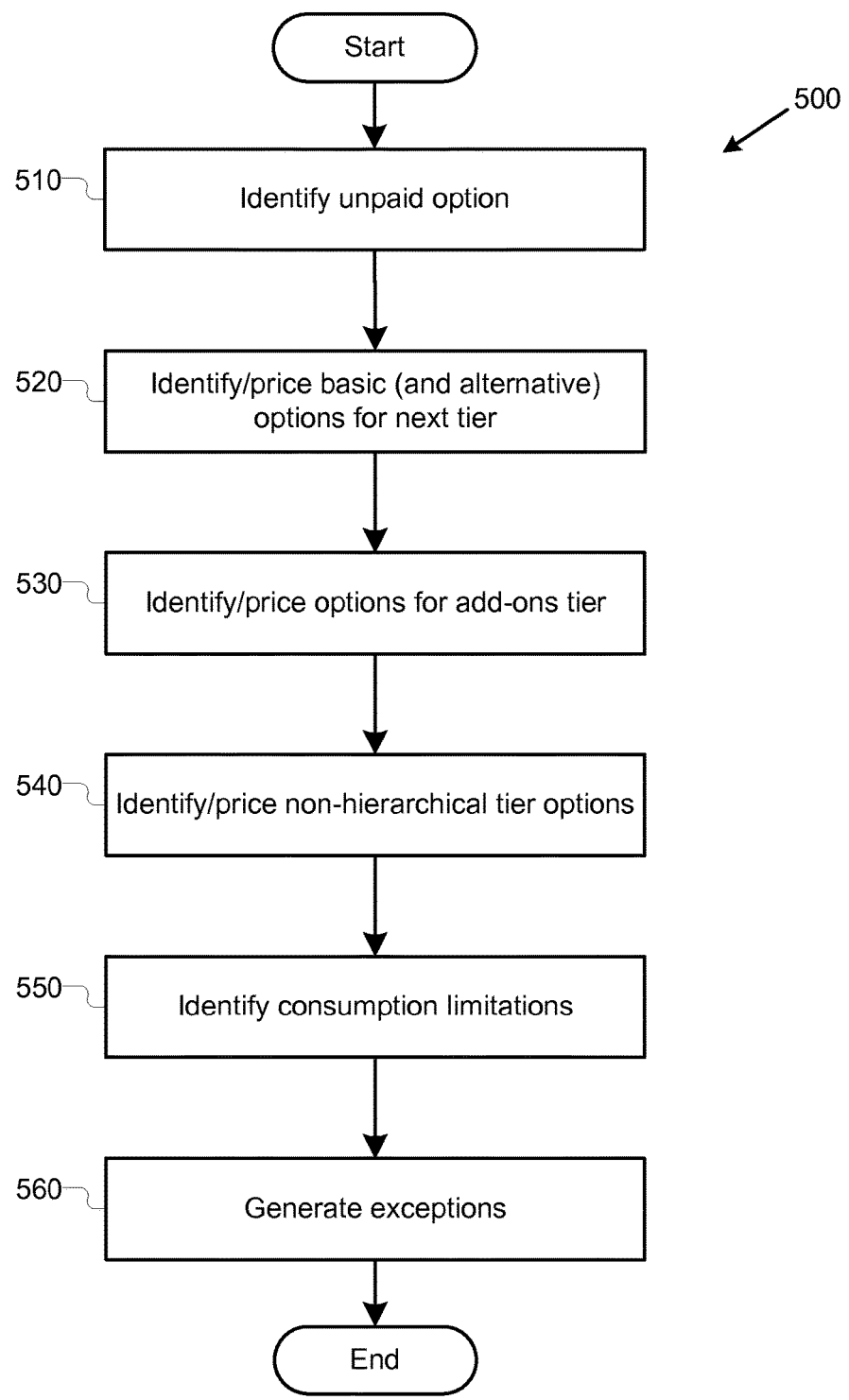
FIG. 5 illustrates an example process for configuring subscription packages, in accordance with various embodiments.

Referring now to FIG. 5, an example process 500 for configuring subscription packages is illustrated in accordance with various embodiments. In various embodiments, the operations described in process 500 may be combined, split into additional operations, and/or omitted. In various embodiments, the subscription selection module 140 of the SPM 110 may perform one or more of the operations of process 500, such as through interactions with the content creators/providers 101. The process may begin at operation 510, where the SPM 110 may identify one or more unpaid subscription package options, such as those illustrated in the example of Tier 1 above. In various embodiments, the SPM 110 may be configured to facilitate content creators/providers 101 in selecting one or more pieces of content, channels, and or other content provision options for inclusion in the unpaid option.

Next, at operation 520, the SPM 110 may identify and price a basic subscription package option, such described above, as well as one or more alternative subscription package options for the next tier. In various embodiments, these subscription package options may be included in a tier that may be satisfied through selection of one of the options. Thus, the subscription package options identified at operation 520 may be, in some embodiments, mutually exclusive, or configured to have overlapping content options such that a content consumer may not desire to select more than one of them. In some embodiments, the alternative subscription package options may include the basic subscription package option as well as additional content. In various embodiments, the content creators/providers 101 may select one or more pieces of content, channels, and or other content provision options for inclusion in the basic subscription package option and/or alternative options. In various embodiments, the price for the subscription package options may be determined, at least in part based on application of business rules to the content identified by the content creators/providers 101.

Next, at operation 520, the SPM 110 may identify and price one or more subscription package options for an add-ons tier (such as Tier 3 in the example above). In various embodiments, these subscription package options may be identified such that one or more of the subscription package options may be selected at the same time. In various embodiments, the add-ons tier may be hierarchically arranged to only be available after satisfaction of a lower tier. Next, at operation 540, the SPM 110 may identify and price one or more non-hierarchical subscription package options, such as those described in the example of Tier 0 above.

At operation 550, the SPM 110 may identify one or more limitations on consumption of content, such as through selection by the content creators/providers 101. For example, the SPM 110 may identify that content is limited by time, such as by time of day or by a period of dates. In other embodiments, the SPM 110 may identify that content may only be viewed by certain content consumers, such as based on age or agreements of the content consumers to be allowed access to particular content. At operation 560, the SPM 110 may identify one or more exceptions to the tiers and/or subscription package options. For example, the SPM 110 may be configured to receive an indication of a time-based exception, such as to offer a discount during a certain period, or to provide exceptions to particular content consumers, such as first-time subscribers, or consumers matching demographics or purchase histories. The process may then end.

Figure 6:
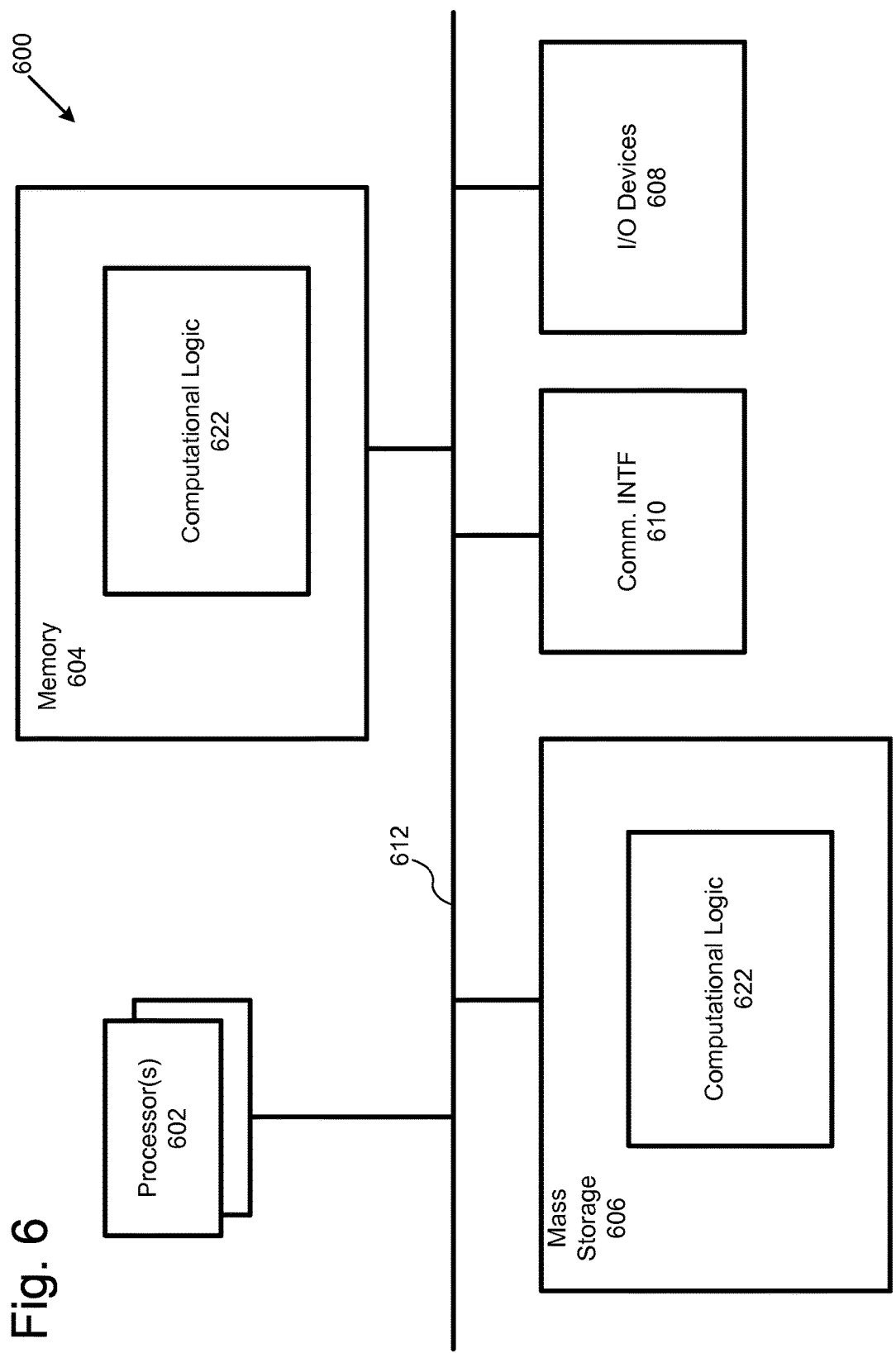
FIG. 6 illustrates an example computing environment suitable for practicing various aspects of the present disclosure, in accordance with various embodiments.

Referring now to FIG. 6, an example computer suitable for use for various components and processes of FIGS. 3-5 is illustrated in accordance with various embodiments. In embodiments, the computer 600 may be suitable for use as a stationary or mobile computing device. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control, remote control, gaming controller, image capture device, and so forth) and communication interfaces 610 (such as network interface cards, modems, infrared receivers, radio receivers (e.g., Bluetooth), and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with SPM 110, e.g., operations shown in FIGS. 3-5. The various elements may be implemented by assembler instructions supported by processor(s) 602 or high-level languages, such as, for example, C, that can be compiled into such instructions.

The permanent copy of the programming instructions may be placed into permanent storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of these elements 610-612 may vary, depending on whether computer 600 is a stationary or mobile device, like a smartphone, computing tablet, ultrabook or laptop. Their constitutions are otherwise known, and accordingly will not be further described.

Figure 7:
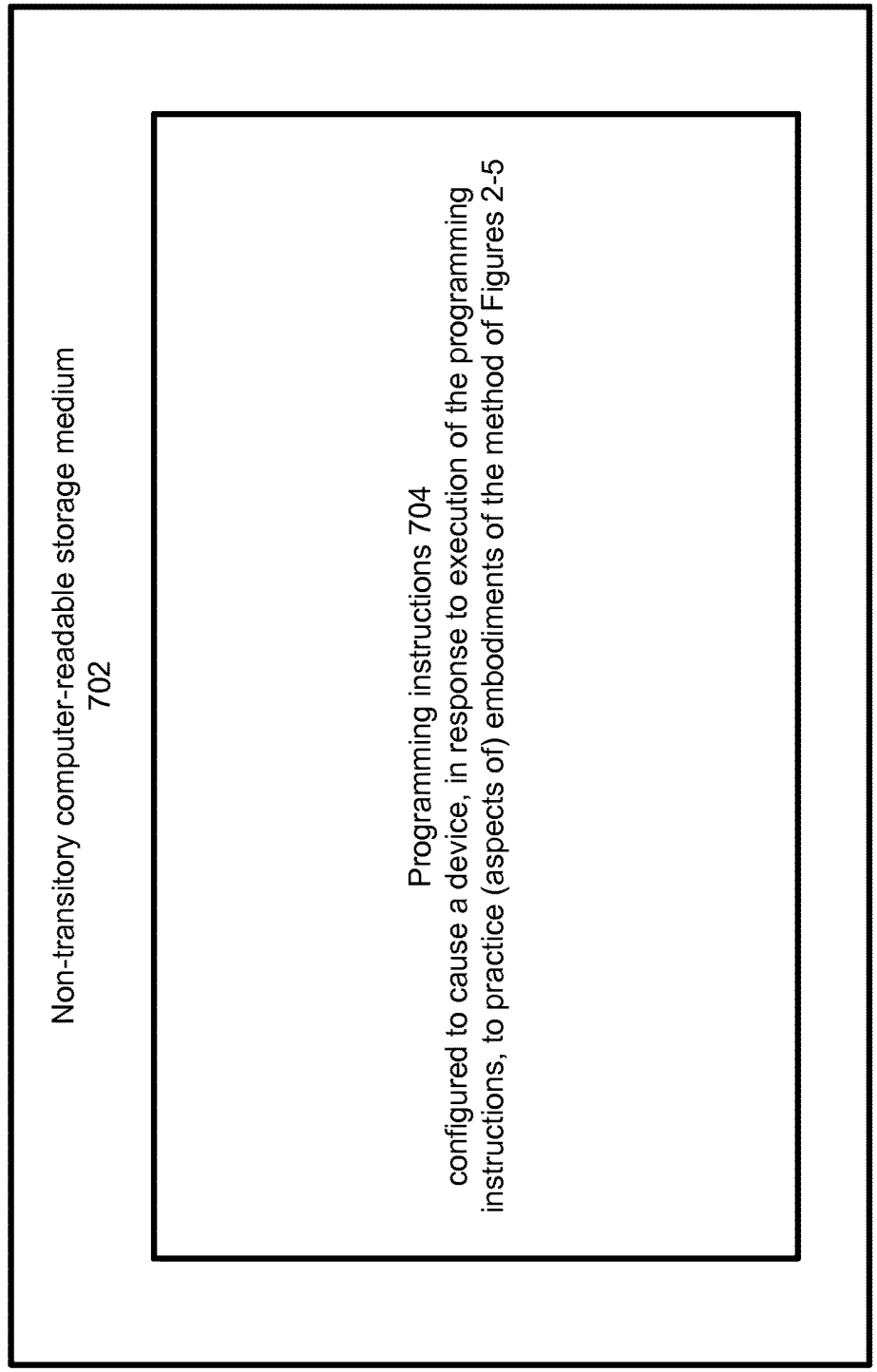
FIG. 7 illustrates an example storage medium with instructions configured to enable an apparatus to practice various aspects of the present disclosure, in accordance with various embodiments.

FIG. 7 illustrates an example least one computer-readable storage medium 702 having instructions configured to practice all or selected ones of the operations associated with content consumption devices 108, earlier described, in accordance with various embodiments. As illustrated, least one computer-readable storage medium 702 may include a number of programming instructions 704. Programming instructions 704 may be configured to enable a device, e.g., computer 600, in response to execution of the programming instructions, to perform, e.g., various operations of processes of FIGS. 3-5, e.g., but not limited to, to the various operations performed to facilitate generation and selection of subscription packages. In alternate embodiments, programming instructions 704 may be disposed on multiple least one computer-readable storage media 702 instead.

Referring back to FIG. 6, for one embodiment, at least one of processors 602 may be packaged together with computational logic 622 configured to practice aspects of processes of FIGS. 3-5. For one embodiment, at least one of processors 602 may be packaged together with computational logic 622 configured to practice aspects of processes of FIGS. 3-5 to form a System in Package (SiP). For one embodiment, at least one of processors 602 may be integrated on the same die with computational logic 622 configured to practice aspects of processes of FIGS. 3-5. For one embodiment, at least one of processors 602 may be packaged together with computational logic 622 configured to practice aspects of processes of FIGS. 3-5 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 includes one or more computer-readable media comprising instructions configured to cause a computing device, in response to execution of the instructions on the computing device, to facilitate configuration of content subscriptions. The instructions are configured to cause the computing device to: facilitate configuration of one or more content subscription tiers configured to organize one or more content subscription packages; facilitate configuration of one or more content subscription packages based on the one or more content subscription tiers; and facilitate selection of the one or more content subscription packages by a content consumer.

Example 2 includes the one or more computer-readable media of Example 1, wherein facilitate configuration of one or more content subscription tiers comprises apply one or more business rules to one or more tier templates.

Example 3 includes the one or more computer-readable media of Example 2, wherein apply one or more business rules to one or more tier templates comprises apply the one or more business rules to the one or more tier templates based at least in part on subscription package information.

Example 4 includes the one or more computer-readable media of Example 3, wherein the subscription package information comprises one or more of regional information, subscriber group information, and/or revenue models.

Example 5 includes the one or more computer-readable media of any of Examples 1-4, wherein facilitate configuration of one or more content subscription tiers comprises facilitate configuration of content subscription tiers by a content provider.

Example 6 includes the one or more computer-readable media of any of Examples 1-4, wherein facilitate configuration of one or more content subscription tiers comprises facilitate configuration of one or more hierarchical tiers.

Example 7 includes the one or more computer-readable media of Example 6, wherein facilitate configuration of one or more hierarchical tiers comprises facilitate configuration of one or more satisfaction criteria for a content subscription tier.

Example 8 includes the one or more computer-readable media of Example 7, wherein a satisfaction criteria for a tier comprises a requirement that all packages in the tier be ordered to satisfy the criteria.

Example 9 includes the one or more computer-readable media of Example 7, wherein a satisfaction criteria for a tier comprises a requirement that at least one package in the tier be ordered to satisfy the criteria.

Example 10 includes the one or more computer-readable media of Example 6, wherein facilitate configuration of one or more hierarchical tiers comprises facilitate configuration of a non-hierarchical content subscription tier.

Example 11 includes the one or more computer-readable media of any of Examples 1-4, wherein facilitate configuration of one or more content subscription packages comprises facilitate identification of one or more unpaid subscription options.

Example 12 includes the one or more computer-readable media of any of Examples 1-4, wherein facilitate configuration of one or more content subscription packages comprises facilitate identification of a basic option for a content subscription tier.

Example 13 includes the one or more computer-readable media of Example 12, wherein facilitate configuration of one or more content subscription packages comprises facilitate identification of an alternative option for the content subscription tier.

Example 14 includes the one or more computer-readable media of any of Examples 1-4, wherein facilitate selection of the one or more content subscription packages comprises present a subscription selection interface to the content consumer.

Example 15 includes the one or more computer-readable media of Example 14, wherein the subscription selection interface is configured to graphically present the one or more content subscription tiers and content subscription packages to the content consumer.

Example 16 includes the one or more computer-readable media of any of Examples 1-4, wherein facilitate configuration of one or more content subscription packages comprises facilitate configuration of subscription packages for one or more of: audio content, video content, and/or game content.

Example 17 includes an apparatus for facilitating configuration of content subscriptions. The apparatus comprises one or more computing processors. The apparatus also comprises a subscription configuration module configured to operate on the one or more computing processors to facilitate configuration of one or more content subscription tiers configured to organize one or more content subscription packages and facilitate configuration of one or more content subscription packages based on the one or more content subscription tiers. The apparatus also comprises a subscription selection module configured to operate on the one or more computing processors to facilitate selection of the one or more content subscription packages by a content consumer.

Example 18 includes the apparatus of Example 17, wherein facilitate configuration of one or more content subscription tiers comprises apply one or more business rules to one or more tier templates.

Example 19 includes the apparatus of Example 18, wherein apply one or more business rules to one or more tier templates comprises apply the one or more business rules to the one or more tier templates based at least in part on subscription package information.

Example 20 includes the apparatus of Example 19, wherein the subscription package information comprises one or more of regional information, subscriber group information, and/or revenue models.

Example 21 includes the apparatus of any of Examples 17-20, wherein facilitate configuration of one or more content subscription tiers comprises facilitate configuration of content subscription tiers by a content provider.

Example 22 includes the apparatus of any of Examples 17-20, wherein facilitate configuration of one or more content subscription tiers comprises facilitate configuration of one or more hierarchical tiers.

Example 23 includes the apparatus of Example 22, wherein facilitate configuration of one or more hierarchical tiers comprises facilitate configuration of one or more satisfaction criteria for a content subscription tier.

Example 24 includes the apparatus of Example 23, wherein a satisfaction criteria for a tier comprises a requirement that all packages in the tier be ordered to satisfy the criteria.

Example 25 includes the apparatus of Example 24, wherein a satisfaction criteria for a tier comprises a requirement that at least one package in the tier be ordered to satisfy the criteria.

Example 26 includes the apparatus of Example 22, wherein facilitate configuration of one or more hierarchical tiers comprises facilitate configuration of a non-hierarchical content subscription tier.

Example 27 includes the apparatus of any of Examples 17-20, wherein facilitate configuration of one or more content subscription packages comprises facilitate identification of one or more unpaid subscription options.

Example 28 includes the apparatus of any of Examples 17-20, wherein facilitate configuration of one or more content subscription packages comprises facilitate identification of a basic option for a content subscription tier.

Example 29 includes the apparatus of Example 28, wherein facilitate configuration of one or more content subscription packages comprises facilitate identification of an alternative option for the content subscription tier.

Example 30 includes the apparatus of any of Examples 17-20, wherein facilitate selection of the one or more content subscription packages comprises present a subscription selection interface to the content consumer.

Example 31 includes the apparatus of Example 30, wherein the subscription selection interface is configured to graphically present the one or more content subscription tiers and content subscription packages to the content consumer.

Example 32 includes the apparatus of any of Examples 17-20, wherein facilitate configuration of one or more content subscription packages comprises facilitate configuration of subscription packages for one or more of: audio content, video content, and/or game content.

Example 33 includes a computer-implemented method for facilitating configuration of content subscription. The method comprises facilitating configuration, by a computing device, of one or more content subscription tiers configured to organize one or more content subscription packages. The method also comprises facilitating configuration, by the computing device, of one or more content subscription packages based on the one or more content subscription tiers. The method also comprises facilitating selection, by the computing device, of the one or more content subscription packages by a content consumer.

Example 34 includes the method of Example 33, wherein facilitating configuration of one or more content subscription tiers comprises applying one or more business rules to one or more tier templates.

Example 35 includes the method of Example 34, wherein applying one or more business rules to one or more tier templates comprises applying the one or more business rules to the one or more tier templates based at least in part on subscription package information.

Example 36 includes the method of Example 35, wherein the subscription package information comprises one or more of regional information, subscriber group information, and/or revenue models.

Example 37 includes the method of any of Examples 33-36, wherein facilitating configuration of one or more content subscription tiers comprises facilitating configuration of content subscription tiers by a content provider.

Example 38 includes the method of any of Examples 33-36, wherein facilitating configuration of one or more content subscription tiers comprises facilitating configuration of one or more hierarchical tiers.

Example 39 includes the method of Example 38, wherein facilitating configuration of one or more hierarchical tiers comprises facilitating configuration of one or more satisfaction criteria for a content subscription tier.

Example 40 includes the method of Example 39, wherein a satisfaction criteria for a tier comprises a requirement that all packages in the tier be ordered to satisfy the criteria.

Example 41 includes the method of Example 39, wherein a satisfaction criteria for a tier comprises a requirement that at least one package in the tier be ordered to satisfy the criteria.

Example 42 includes the method of Example 38, wherein facilitating configuration of one or more hierarchical tiers comprises facilitating configuration of a non-hierarchical content subscription tier.

Example 43 includes the method of any of Examples 33-36, wherein facilitating configuration of one or more content subscription packages comprises facilitating identification of one or more unpaid subscription options.

Example 44 includes the method of any of Examples 33-36, wherein facilitating configuration of one or more content subscription packages comprises facilitating identification of a basic option for a content subscription tier.

Example 45 includes the method of Example 44, wherein facilitating configuration of one or more content subscription packages comprises facilitating identification of an alternative option for the content subscription tier.

Example 46 includes the method of any of Examples 33-36, wherein facilitating selection of the one or more content subscription packages comprises presenting a subscription selection interface to the content consumer.

Example 47 includes the method of Example 46, wherein the subscription selection interface is configured to graphically present the one or more content subscription tiers and content subscription packages to the content consumer.

Example 48 includes the method of any of Examples 33-36, wherein facilitating configuration of one or more content subscription packages comprises facilitating configuration of subscription packages for one or more of: audio content, video content, and/or game content.

Example 49 includes an apparatus for facilitating configuration of content subscription. The apparatus comprises means for facilitating configuration, by a computing device, of one or more content subscription tiers configured to organize one or more content subscription packages. The apparatus also comprises means for facilitating configuration, by the computing device, of one or more content subscription packages based on the one or more content subscription tiers. The apparatus also comprises means for facilitating selection, by the computing device, of the one or more content subscription packages by a content consumer.

Example 50 includes the apparatus of Example 49, wherein means for facilitating configuration of one or more content subscription tiers comprises means for applying one or more business rules to one or more tier templates.

Example 51 includes the apparatus of Example 50, wherein means for applying one or more business rules to one or more tier templates comprises means for applying the one or more business rules to the one or more tier templates based at least in part on subscription package information.

Example 52 includes the apparatus of Example 51, wherein the subscription package information comprises one or more of regional information, subscriber group information, and/or revenue models.

Example 53 includes the apparatus of any of Examples 49-52, wherein means for facilitating configuration of one or more content subscription tiers comprises means for facilitating configuration of content subscription tiers by a content provider.

Example 54 includes the apparatus of any of Examples 49-52, wherein means for facilitating configuration of one or more content subscription tiers comprises means for facilitating configuration of one or more hierarchical tiers.

Example 55 includes the apparatus of Example 54, wherein means for facilitating configuration of one or more hierarchical tiers comprises means for facilitating configuration of one or more satisfaction criteria for a content subscription tier.

Example 56 includes the apparatus of Example 55, wherein a satisfaction criteria for a tier comprises a requirement that all packages in the tier be ordered to satisfy the criteria.

Example 57 includes the apparatus of Example 55, wherein a satisfaction criteria for a tier comprises a requirement that at least one package in the tier be ordered to satisfy the criteria.

Example 58 includes the apparatus of Example 54, wherein means for facilitating configuration of one or more hierarchical tiers comprises means for facilitating configuration of a non-hierarchical content subscription tier.

Example 59 includes the apparatus of any of Examples 49-52, wherein means for facilitating configuration of one or more content subscription packages comprises means for facilitating identification of one or more unpaid subscription options.

Example 60 includes the apparatus of any of Examples 49-52, wherein means for facilitating configuration of one or more content subscription packages comprises means for facilitating identification of a basic option for a content subscription tier.

Example 61 includes the apparatus of Example 60, wherein means for facilitating configuration of one or more content subscription packages comprises means for facilitating identification of an alternative option for the content subscription tier.

Example 62 includes the apparatus of any of Examples 49-52, wherein means for facilitating selection of the one or more content subscription packages comprises means for presenting a subscription selection interface to the content consumer.

Example 63 includes the apparatus of Example 62, wherein the subscription selection interface is configured to graphically present the one or more content subscription tiers and content subscription packages to the content consumer.

Example 64 includes the apparatus of any of Examples 49-52, wherein means for facilitating configuration of one or more content subscription packages comprises means for facilitating configuration of subscription packages for one or more of: audio content, video content, and/or game content.

Computer-readable media (including least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable media comprising instructions configured to cause a computing device, in response to execution of the instructions on the computing device, to:
   configure one or more content subscription tiers to organize one or more content subscription packages, wherein, when configuring the one or more content subscription tiers, the instructions are configured to cause the computing device to:
      identify revenue models for the one or more content subscription tiers based on regions where content is to be provided and subscriber groups that consume the content;
      identify one or more tier templates; and
      apply rules to the revenue models and the one or more tier templates to configure the one or more content subscription tiers;
   configure one or more content subscription packages for each content subscription tier based on the one or more content subscription tiers;
   send, to a content consumption device associated with a content consumer, information associated with the one or more content subscription packages, wherein the information associated with the one or more content subscription packages is displayed on the content consumption device;
   receive, from the content consumption device, an indication of a selection of a content subscription package of the one or more content subscription packages, wherein a particular content subscription package, of the one or more content subscription packages, in a particular content subscription tier is selectable only when requirements for a lower hierarchical content subscription tier have been satisfied; and
   provide content corresponding to the selected content subscription package to the content consumption device.

2. The one or more non-transitory computer-readable media of claim 1, wherein, when configuring the one or more content subscription tiers, the instructions are configured to cause the computing device to apply one or more business rules to the one or more tier templates.

3. The one or more non-transitory computer-readable media of claim 2, wherein, when applying the one or more business rules to the one or more tier templates, the instructions are configured to cause the computing device to apply the one or more business rules to the one or more tier templates based at least in part on subscription package information.

4. The one or more non-transitory computer-readable media of claim 3, wherein the subscription package information comprises one or more of information associated with the regions or information associated with the subscriber groups.

5. The one or more non-transitory computer-readable media of claim 1, wherein, when configuring the one or more content subscription tiers, the instructions are configured to cause the computing device to facilitate configuration of content subscription tiers by a content provider.

6. The one or more non-transitory computer-readable media of claim 1, wherein, when configuring the one or more content subscription tiers, the instructions are configured to cause the computing device to configure one or more hierarchical tiers.

7. The one or more non-transitory computer-readable media of claim 6, wherein, when configuring the one or more content subscription tiers, the instructions are configured to cause the computing device to configure one or more satisfaction criteria for a content subscription tier.

8. The one or more non-transitory computer-readable media of claim 7, wherein the one or more satisfaction criteria for the content subscription tier comprises a requirement that all packages in the tier be ordered to satisfy the criteria or a requirement that at least one package in the tier be ordered to satisfy the criteria.

9. The one or more non-transitory computer-readable media of claim 6, wherein, when configuring the one or more content subscription tiers, the instructions are configured to cause the computing device to configure a nonhierarchical content subscription tier.

10. The one or more non-transitory computer-readable media of claim 1, wherein, when configuring the one or more content subscription packages, the instructions are configured to cause the computing device to identify one or more unpaid subscription options.

11. The one or more non-transitory computer-readable media of claim 1, wherein, when configuring the one or more content subscription packages, the instructions are configured to cause the computing device to identify a basic option for a content subscription tier.

12. The one or more non-transitory computer-readable media of claim 1, wherein, when configuring the one or more content subscription packages, the instructions are configured to cause the computing device to identify an alternative option for the content subscription tier.

13. The one or more non-transitory computer-readable media of claim 1, wherein, when sending the information associated with the one or more content subscription packages, the instructions are configured to cause the computing device to present a subscription selection interface that is configured to graphically present the one or more content subscription tiers and content subscription packages to the content consumer.

14. The one or more non-transitory computer-readable media of claim 1, wherein, when configuring the one or more content subscription tiers, the instructions are configured to cause the computing device to configure subscription packages for one or more of: audio content, video content, or game content.

15. An apparatus comprising:
a memory storing instructions; and
one or more computing processors configured to execute the instructions to:
generate one or more content subscription tiers configured to organize one or more content subscription packages, wherein, when executing the instructions to generate the one or more content subscription tiers, the one or more computing processors are configured to:
identify revenue models for the one or more content subscription tiers based on regions where content is to be provided and subscriber groups that consume the content;
identify one or more tier templates; and
apply rules to the revenue models and the one or more tier templates to generate the one or more content subscription tiers;
identify one or more content subscription packages for each content subscription tier based on the one or more content subscription tiers;
send, to a content consumption device associated with a content consumer, information associated with the one or more content subscription packages, wherein the information associated with the one or more content subscription packages is displayed on the content consumption device;
receive, from the content consumption device, an indication of a selection a content subscription package of the one or more content subscription packages by the content consumer, wherein a particular content subscription package, of the one or more content subscription packages, in a particular content subscription tier is selectable only when requirements for a lower hierarchical content subscription tier have been satisfied; and
provide content corresponding to the content subscription package to the content consumption device.

16. The apparatus of claim 15, wherein, when executing the instructions to generate the one or more content subscription tiers, the one or more computing processors are configured to apply one or more business rules to the one or more tier templates.

17. The apparatus of claim 15, wherein, when executing the instructions to generate the one or more content subscription tiers, the one or more computing processors are configured to generate one or more hierarchical tiers.

18. The apparatus of claim 15, wherein, when executing the instructions to send the information associated with the one or more content subscription packages, the one or more computing processors are configured to present a subscription selection interface to the content consumer.

19. A computer-implemented method comprising:
generating, by a computing device, one or more content subscription tiers configured to organize one or more content subscription packages, wherein generating the one or more content subscription tiers comprises:
identifying revenue models for the one or more content subscription tiers based on regions where content is to be provided and subscriber groups that consume the content;
identifying one or more tier templates; and
applying rules to the revenue models and the one or more tier templates to generate the one or more content subscription tiers;
identifying, by the computing device, one or more content subscription packages for each content subscription tier based on the one or more content subscription tiers;
providing for selection, by the computing device, of the one or more content subscription packages by a content consumer, wherein a particular content subscription package, of the one or more content subscription packages, in a particular content subscription tier is selectable only when requirements for a lower hierarchical content subscription tier have been satisfied;
receiving, by the computing device and from a device associated with the content consumer, an indication of a selection of a content subscription package of the one or more content subscription packages; and
providing, by the computing device and to the device associated with the content consumer, content corresponding to the selected content subscription package.

20. The method of claim 19, wherein generating the one or more content subscription tiers comprises applying one or more business rules to the one or more tier templates.

21. The method of claim 19, wherein generating the one or more content subscription tiers comprises facilitating configuration of one or more hierarchical tiers.

22. The method of claim 19, wherein providing for selection of the one or more content subscription packages comprises presenting a subscription selection interface to the content consumer.

23. An apparatus comprising:
a memory configured to store instructions; and
one or more processors configured to execute the instructions to:
    facilitate configuration of one or more content subscription tiers configured to organize one or more content subscription packages, wherein, when executing the instructions to facilitate configuration of the one or more content subscription tiers, the one or more processors are configured to:
        identify revenue models for the one or more content subscription tiers based on regions where content is to be provided and subscriber groups that consume the content;
        identify one or more tier templates; and
        apply rules to the revenue models and the one or more tier templates to facilitate the configuration of the one or more content subscription tiers;
    facilitate configuration, of one or more content subscription packages for each content subscription tier based on the one or more content subscription tiers;
    send, to a content consumption device associated with a content consumer, information associated with the one or more content subscription packages, wherein the information associated with the one or more content subscription packages is displayed on the content consumption device;
    receive, from the content consumption device, an indication of a selection of a content subscription package of the one or more content subscription packages by the content consumer, wherein a particular content subscription package, of the one or more content subscription packages, in a particular content subscription tier is selectable only when requirements for a lower hierarchical content subscription tier have been satisfied; and
    facilitate providing content corresponding to the content subscription package to the content consumption device.

24. The apparatus of claim 23, wherein the one or more processors configured to execute the instructions to facilitate configuration of the one or more content subscription tiers comprises one or more processors configured to execute the instructions to apply one or more business rules to the one or more tier templates.

25. The apparatus of claim 23, wherein the one or more processors configured to execute the instructions to facilitate configuration of the one or more content subscription tiers comprises one or more processors configured to execute the instructions to facilitate configuration of one or more hierarchical tiers.

* * * * *